United States Patent
Gupta et al.

(10) Patent No.: US 8,910,111 B2
(45) Date of Patent: Dec. 9, 2014

(54) SOFTWARE MAP TO REPRESENT INFORMATION REGARDING SOFTWARE DEVELOPMENT EVENTS

(75) Inventors: Sanjeev K. Gupta, Santa Clara, CA (US); Cleo X. Barretto, San Jose, CA (US); Jasmeet Bhatia, San Jose, CA (US); Rakesh R. Kamath, Santa Clara, CA (US); Sukhwinder Singh, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 12/905,122

(22) Filed: Oct. 15, 2010

(65) Prior Publication Data

US 2012/0096425 A1    Apr. 19, 2012

(51) Int. Cl.
G06F 9/44 (2006.01)
G06Q 10/06 (2012.01)

(52) U.S. Cl.
CPC *G06F 8/70* (2013.01); *G06Q 10/06* (2013.01); *G06Q 10/06395* (2013.01)
USPC .......................................................... 717/101

(58) Field of Classification Search
USPC .......................................................... 707/101
See application file for complete search history.

(56) References Cited

U.S. PATENT DOCUMENTS

| | | | | |
|---|---|---|---|---|
| 5,933,143 | A * | 8/1999 | Kobayashi ..................... | 715/805 |
| 6,993,759 | B2 | 1/2006 | Aptus et al. | |
| 7,076,496 | B1 | 7/2006 | Ruizandrade | |
| 8,522,207 | B1 * | 8/2013 | Whittington et al. ......... | 717/122 |
| 2002/0078432 | A1 * | 6/2002 | Charisius et al. ............. | 717/102 |
| 2004/0001106 | A1 * | 1/2004 | Deutscher et al. ............ | 345/838 |
| 2008/0313595 | A1 * | 12/2008 | Boulineau et al. ............ | 717/101 |
| 2009/0083308 | A1 * | 3/2009 | Wall et al. ..................... | 707/102 |
| 2010/0017740 | A1 * | 1/2010 | Gonzalez Veron et al. ... | 715/777 |
| 2011/0071869 | A1 * | 3/2011 | O'Brien et al. ................ | 705/7 |

OTHER PUBLICATIONS

Widha, Ronald, "Branch Management Patterns part 3 of 3: Feature Branch", https://web.archive.org/web/20100509235154/http://www.ronaldwidha.net/2010/03/21/branch-management-patterns-part-3-of-3-feature-branch/, May 9, 2010, Retrieved Apr. 17, 2014.*

J.D., Meier, Taylor Jason, Bansode Prashant, Mackman Alex, and Jones Kevin. "Chapter 5: Defining Your Branching and Merging Strategy." Sep. 2007. Web. Aug. 7, 2014. <http://msdn.microsoft.com/en-us/library/bb668955.aspx>.*

"Plastic SCM GUI Guide A Guide for Using Plastic SCM from the Graphical User Interface Release Version 3.0." Plasticscm, Codicesoftware, Jul. 20, 2010. Web. Aug. 7, 2014. <http://www.plasticscm.com/releases/3.0/manuals/en/guiguide.pdf>.*

* cited by examiner

*Primary Examiner* — Chameli Das
*Assistant Examiner* — Joanne Macasiano
(74) *Attorney, Agent, or Firm* — Edell, Shapiro & Finnan, LLC

(57) ABSTRACT

In one embodiment a method is provided for rendering a software map. The method includes storing, in an electronic database, information associated with a software development project, the information including start and end dates of particular efforts made in connection with the software development project and dates of specific events associated with the software development project, rendering on a display a timeline, and rendering on the display a software map, wherein the software map includes horizontal lines representing the particular efforts that extend between endpoints defined, substantially, by the start and end dates, and that are aligned with a time scale of the timeline, and vertically or substantially vertical extending lines between and connecting pairs of horizontal lines, wherein each vertically or substantially vertically extending line represents one of the specific events associated with the software development project.

20 Claims, 16 Drawing Sheets

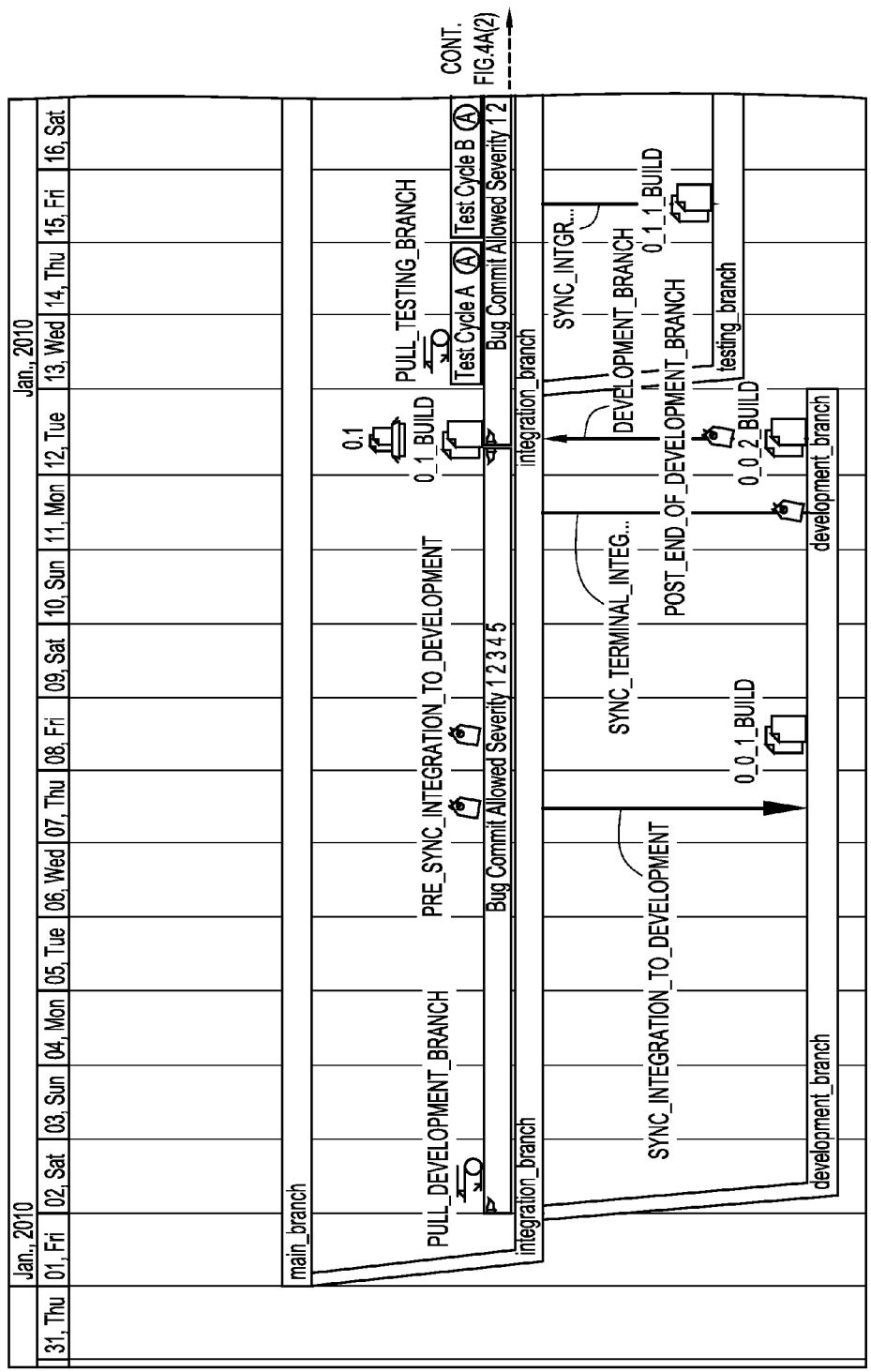
FIG.4A(1)

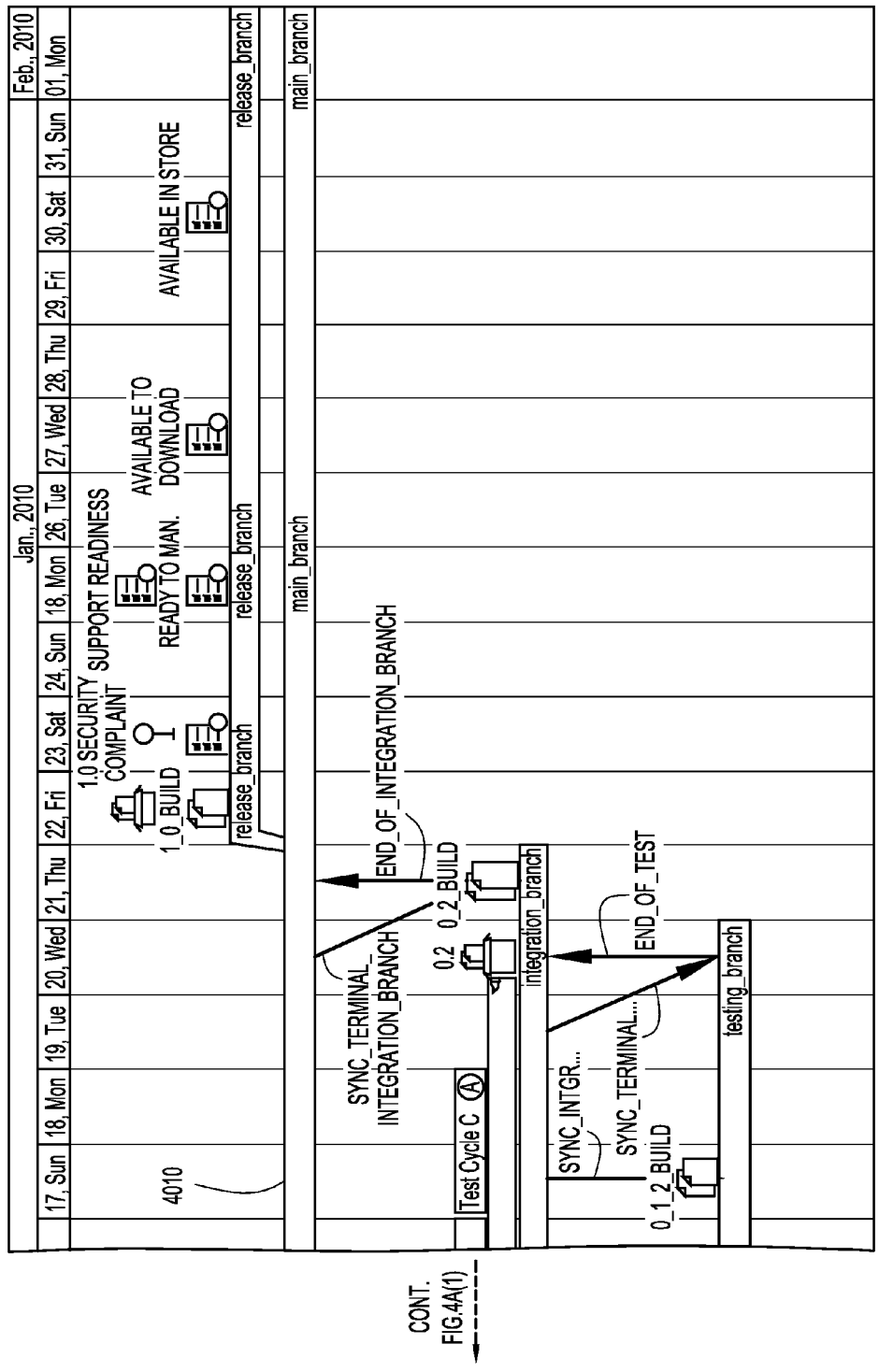
FIG.4A(2)

SOFTWARE MAP TO REPRESENT INFORMATION REGARDING SOFTWARE DEVELOPMENT EVENTS

TECHNICAL FIELD

The present disclosure relates to systems and methods for managing, monitoring, and planning software development.

BACKGROUND

Software applications are typically developed by teams of programmers, software engineers, managers, etc. As software applications have grown in complexity and scope, so have the number of personnel involved in the development process. In many cases of large software application development, different groups of programmers, etc. will work independently on aspects of the application and periodically merge together into a single working application the results of their respective efforts. Keeping track of the efforts and milestones of the individual teams, as well as the milestones of the merged product can be daunting.

Moreover, once a given software application is released to a customer or client, an entirely new set of challenges befall the application developers. For example, software bugs may be identified and scheduled for fixes. Similarly, code enhancements may be identified that address specific customer problems not previously anticipated during the initial development process. Thus, software code that has already been fielded or released must also be closely monitored and managed in order to ensure quality and cost control (e.g., it may be wasteful for multiple teams of programmers to address the same identified software bug).

Accordingly, there is a need for improved tools for monitoring and managing the life cycle of software development, especially large scale software applications.

BRIEF DESCRIPTION OF THE DRAWINGS

FIGS. 4A and 4B are screenshots of simpler versions of rendered software maps.

DESCRIPTION OF EXAMPLE EMBODIMENTS

Overview

In one embodiment a method is provided for rendering a software map that represents and helps to visualize the complex history of a software development project. The method includes storing, in an electronic database, information associated with a software development project, the information including start and end dates of particular efforts made in connection with the software development project and dates of specific events associated with the software development project, rendering on a display a timeline, and rendering on the display a software map, wherein the software map includes horizontal lines representing the particular efforts that extend between endpoints defined, substantially, by the start and end dates, and that are aligned with a time scale of the timeline, and vertically or substantially vertically extending lines between and connecting pairs of horizontal lines, wherein the vertically or substantially vertically extending lines represent the dates of the specific events associated with the software development project.

Example Embodiments

The systems and methodologies described herein provide a visual and interactive mapping application that graphically renders software releases and branches for larger scale software applications. It can be used by virtually anyone who creates, supports, and manages software development. The mapping application provides users with a single information portal to view real-time complex branch hierarchies, their schedules, related contextual information, bugs, labels and host of other information. The mapping application operates by aggregating and maintaining data in a graphical interface.

As will be appreciated by those skilled in the art, the mapping application can eliminate data confusion, improve workflows, improve quality, improved customer experience and enhance the way in which software applications are created, managed and supported within a software application development environment.

Figure 1:
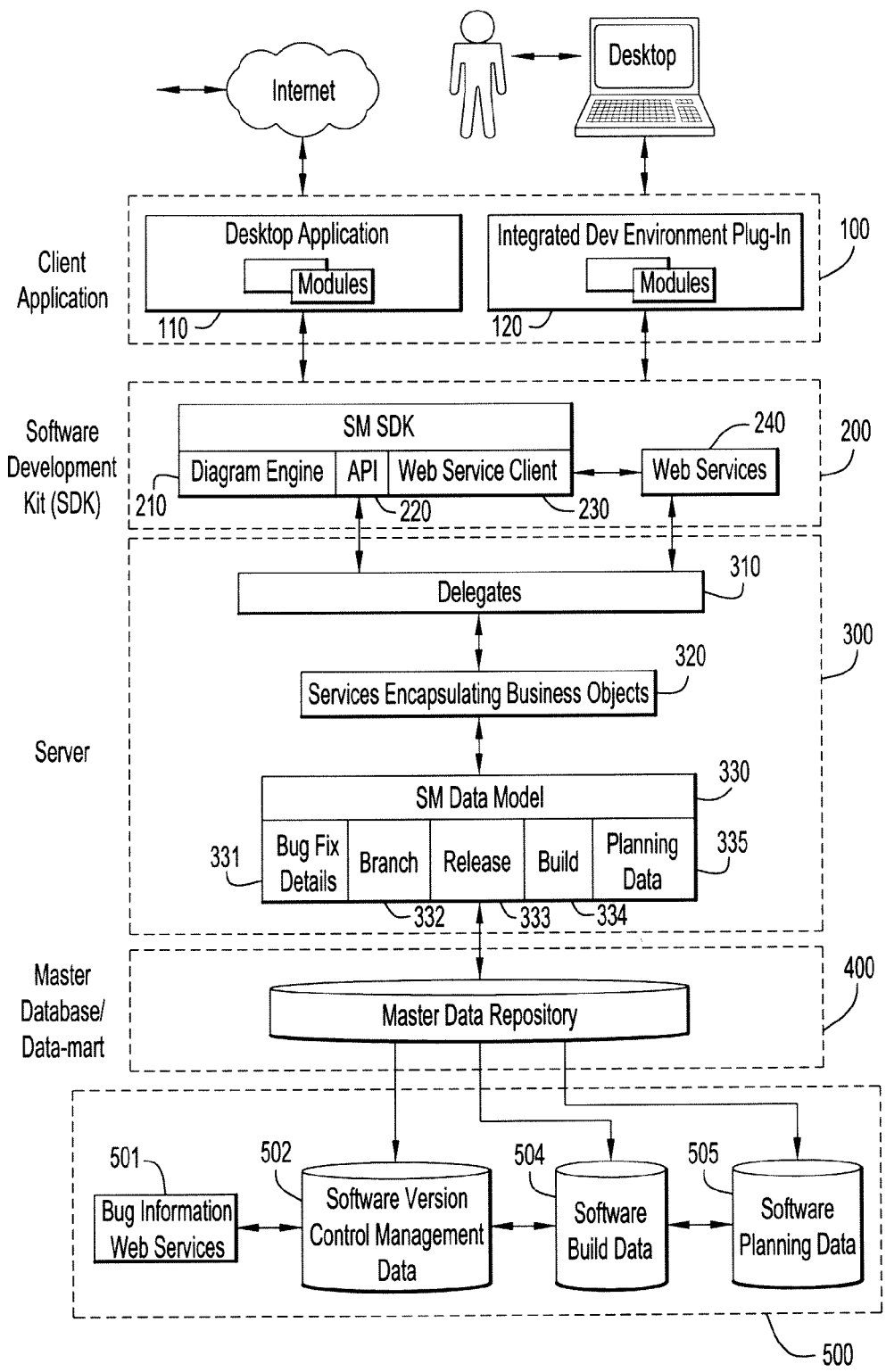
FIG. 1 shows a system architecture for collecting data and generating a software map.

FIG. 1 shows a system architecture for collecting data and generating a software map in accordance with an example embodiment of the Software Map (SM) application.

Client Application 100 is a user interface that a client uses to access the SM application. In the depicted embodiment, the Client Application 100 supports a Desktop client application 110 and Integrated Development Environment (IDE) plug-in 120. The Desktop application 110 may be a Web enabled application that the user interacts with to access the features of the SM application. The IDE Plug-in 120 may be a plug-in that the user interacts with to access the features of the SM application.

The system architecture further includes a Software Development Kit (SDK) 200, which is a reusable software library that provides Application Programming Interfaces (APIs) 220. APIs 220 provide access to the diagramming functionality for SM application developers using the Desktop application 110 or IDE Plug-in 120, as well as to Server 300. As indicated, the SM SDK 200 further comprises a diagram engine 210 that is a graphical component that renders a graphical image of software development and milestones, and a Web service client 230 that enables access via Web services 240, i.e., an entry point for remote client applications to access data services.

The system architecture still further includes Server 300, which provides data services to enable graphical visualization of software maps and to solve visualization workflows. Server 300 comprises several components, as follows.

Delegates module 310 provides access to the business service, such as lookup and access details. The term "business service" is meant to connote user level information versus programming level information. That is, and as will be described later herein, a user may want to view a particular "branch" of software, and the Delegates module 310 is configured to "translate" that "branch" request to a code request that is understandable by the SM application. Stated alternatively, Delegates module 310 operates to abstract "business" level nomenclature from coding nomenclature. A Services Encapsulating Business Objects module 320 provides access to an underlying data model. This module 320 manages business objects and provides an access layer to the SM SDK 200.

SM Data Model 330 is a data-model for software maps that aggregates software version control and planning information. The model 330 is based on multiple sources of information including Bug fix details 331, Branch information 332, Build information 334 and Planning data 335.

The SM Data model 330 receives most of its information from Master Data Repository 400 that functions as a consolidated data repository and transforms data into an appropriate format for the SM application.

The Master Data Repository 400 receives its information/data from a Master Source of Records 500 that comprises several components including Bug Information Web Services 501 (which is shown in FIG. 1 has being in communication directly with Bug Details Fix 331), Software Version Control Management Data 502, which is a repository of source control management information, Software build information data 504, which is a data repository of software builds (where a "build" is a process of compiling and packaging source file into a binary image), and Software planning information 505, which is a repository of planning information (this repository includes planning information that is used for successful delivery of a software build).

It should be noted that the elements depicted in FIG. 1 may be implemented as one or more hardware components, one or more software components (written in, e.g., C++, Java, microcode, among many other possible languages/implementations), or combinations thereof. For example, SDK 200 and components of server 300 may be comprised of, or be in communication with, a programmable processor (microprocessor or microcontroller) or a fixed-logic processor. In the case of a programmable processor, any associated memory may be of any type of tangible processor readable memory (e.g., random access, read-only, etc.) that is encoded with or stores instructions that may be employed to effect the SM application functionality briefly described above and in more detail below. Alternatively, SDK 200 and components of server 300 may be comprised of a fixed-logic processing device, such as an application specific integrated circuit (ASIC) or digital signal processor that is configured with firmware comprised of instructions or logic that cause the processor to perform the functions described herein.

Thus, elements shown in FIG. 1 may take any of a variety of forms so as to be encoded in one or more tangible media for execution, such as with fixed logic or programmable logic (e.g., software/computer instructions executed by a processor) and any processor may be a programmable processor, programmable digital logic (e.g., field programmable gate array) or an ASIC that comprises fixed digital logic, or a combination thereof. In general, any process logic may be embodied in a processor readable medium that is encoded with instructions for execution by a processor that, when executed by the processor, are operable to cause the processor to perform the functions described herein.

Figure 2:
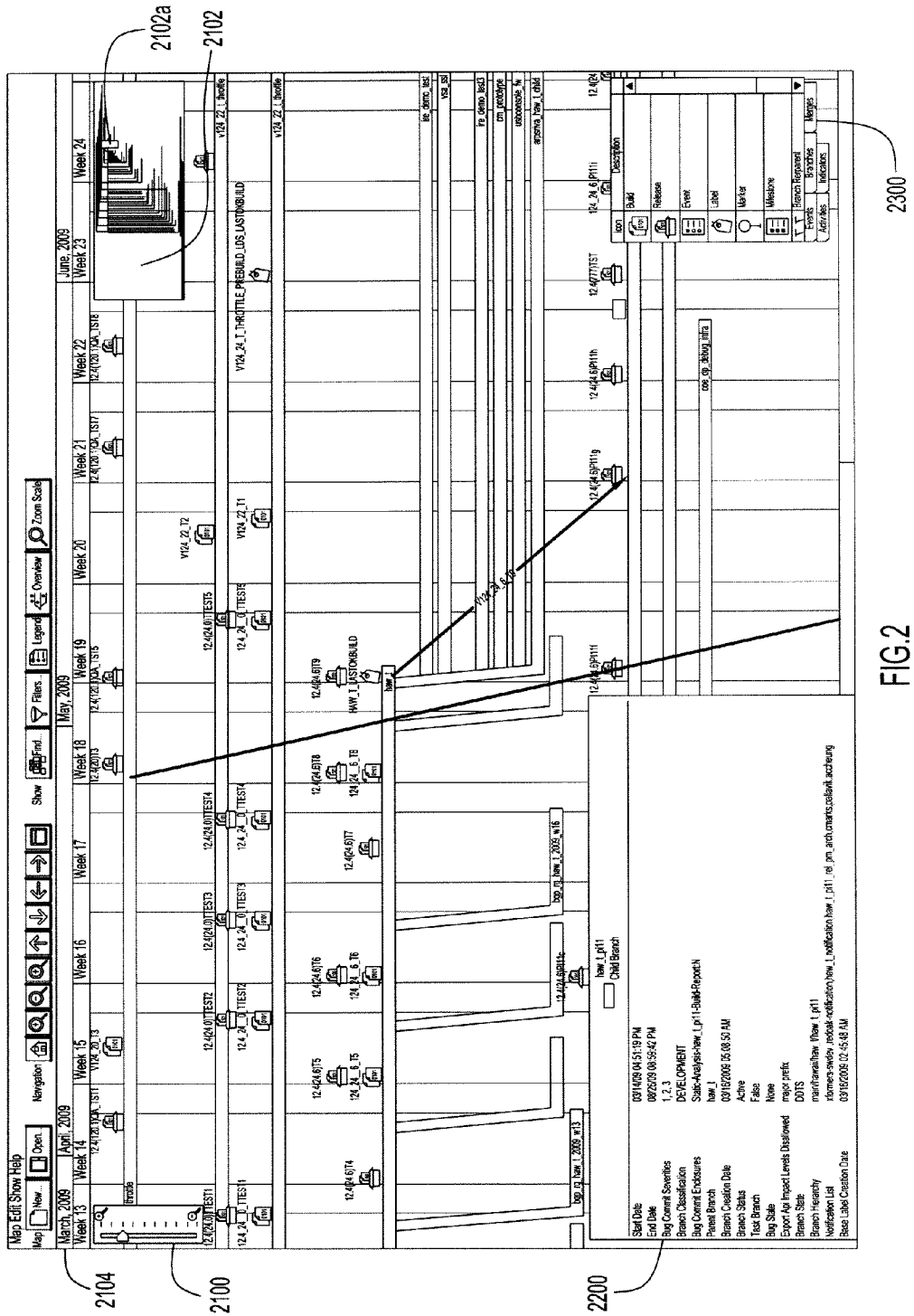
FIG. 2 is a screenshot of one embodiment of a graphically rendered software map.

The ultimate goal of the structure of FIG. 1 is to capture and aggregate the data/information in one or more databases that are then employed to generate or render a software map like that shown in FIG. 2. It is noted that the databases or repositories described herein may be relational database, flat files, or any other suitable structure for storing and access data.

FIG. 2 is a screenshot of one embodiment of a graphically rendered software map. In this embodiment, the SM application renders a graphical image of the milestones associated with a large software development project. On the upper left hand side of FIG. 2 there is a zoom control 2100 that enables a user to zoom in or out of the rendered software map. To provide context, a full software map 2102 is displayed in the upper right hand corner and includes a rectangle 2102a that indicates the extent of the view being rendered in the background on the display with respect to an entire software map.

A time line 2104 is provided in an upper area of the screen and may show year/month granularity. Of course, the granularity is a function of how much the user chooses to zoom in or out. Noteworthy with respect to the time line 2104 is that colored columns extend vertically, and the in the case of FIG. 2, delineate specific weeks of the month/year. This facilitates the visualization of the timing of events, etc., as described more fully below. Several selectable buttons are arranged near a top portion of the screen above timeline 2104. These buttons provide various functions including, among others, zooming and zoom scale, arrows for moving to different parts of the software map being depicted, and a find tool to find specific branches or events. It should be noted that, in an embodiment, the amount of detail shown in a given view of the software map can be tied to the level of zoom, such that, for example, the greater the zoom, the greater the amount of detail that is rendered. Also, filtering may be employed to customize the amount of detail and types of information that is rendered. Filter setting can also be stored so that customized views may be quickly rendered during subsequent sessions of using the SM application.

The main part of the screen of FIG. 2 is filled with substantially horizontally extending "lines" or trains that represent respective branches of code development. Along selected lines are one or more icons and associated indicia that represent specific milestones or events associated with that branch. A discussion of an example software map of a "smaller" software development project is discussed with respect to FIGS. 4A and 4B.

At the bottom of the screenshot shown in FIG. 2 there is a window 2200 that provides specific text-based detail regarding an identified branch. In an embodiment, a user can hover a mouse or other pointing device over a selected branch, and window 2200 will be populated for that selected branch. Window 2200 includes information such as the name of the branch, its start and end dates, bug commit severities, branch classification, bug commit enclosures, parent branch, branch creation date, branch status (e.g., active or inactive), task branch, bug state, Export API impact levels disallowed, branch state, branch hierarchy, notification list, and base label creation date. Of course, those skilled in the art will appreciate that the foregoing specific types of information are merely examples of the types of information that might be presented to a user through window 2200.

On the bottom right hand side of the screen shown in FIG. 2 there is a window 2300 that provides a helpful icon legend to a user. Tabs are provided (on the bottom) to more easily navigate through the legend. FIGS. 3A-3L are described next. These figures depict screenshots of individual events that might be depicted or rendered on a software map. Also described next is data that may be stored in connection with each of these events. As is seen in FIGS. 3A-3L (and FIGS. 2, 4A, and 4B) events may also be indicated by a respective representative icon.

Figure 3B:
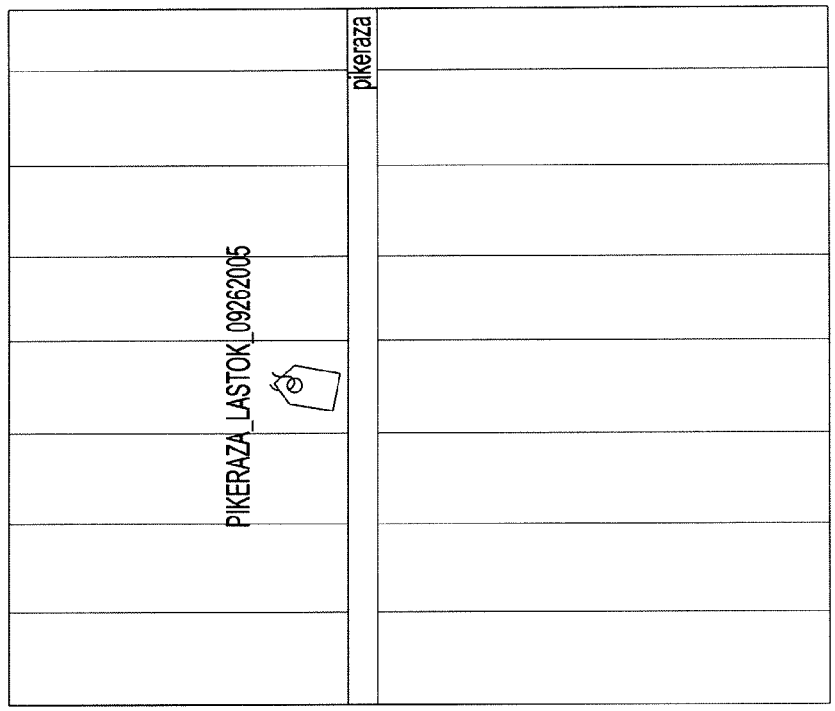
FIGS. 3A-3L respectively show screenshots of individual events that are represented by predetermined icons in connection with a rendered software map.
Figure 3A:
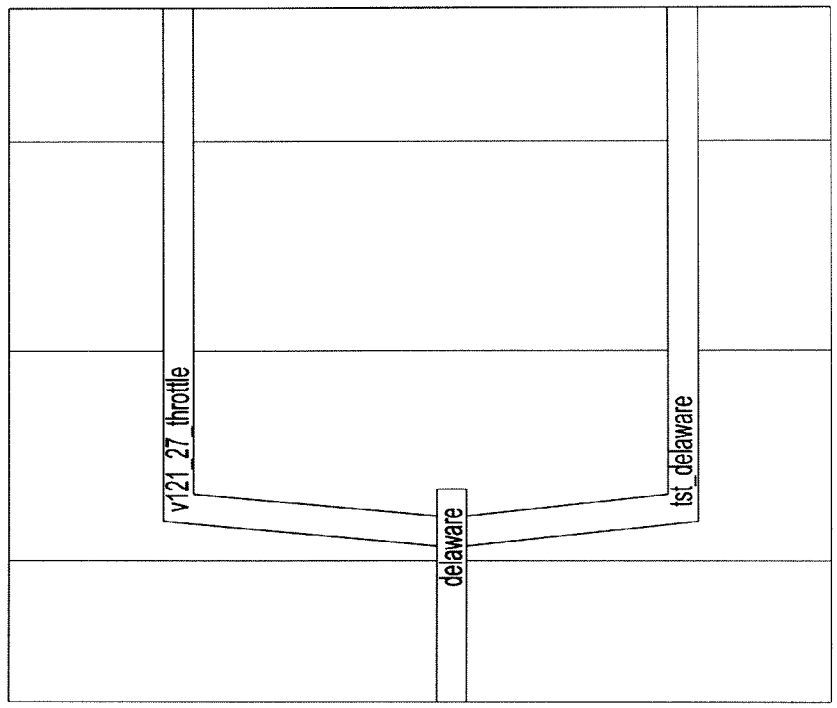

Branch (FIG. 3A)

A branch is an object that specifies a linear sequence of versions of an element. Software Version Control Management 502 uses branches to organize the different versions of files, directories and objects that are placed under version control. Branch data comprises the following:

| Data Item | Explanation |
| --- | --- |
| Repository | Repository in which the branch is created |
| Branch name | Name of the branch |
| Branch type | To identify throttle, child or mainline. |
| Parent branch name | Name of the parent branch |
| Branch start date | This data represents starting point of the branch line. |
| Branch end date | This data represents last event on the branch (i.e. end point of the branch line) |

Event

An event represents any single-moment-in-time fact that applies to a branch that is related to the development or release of software hosted by the branch.

Label (FIG. 3B)

A label represents the fact that, at a given point in time, the software hosted by the given branch has been marked to identify some business characteristic thereof, e.g., "available in store." Label data comprises the following:

| Data Item | Explanation |
| --- | --- |
| Label Name | Name of the label |
| Branch | Branch on which the label is created |
| Label Create Date | date on which the label was created |
| Label Ref Time | Last commit date time before the label was created |

Figure 3D:
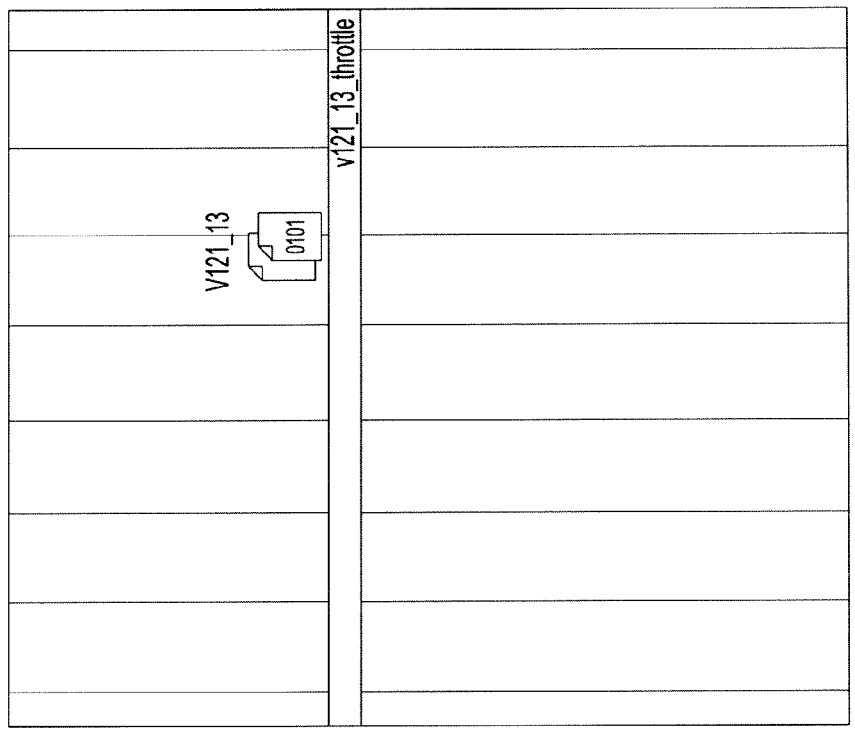
Figure 3C:
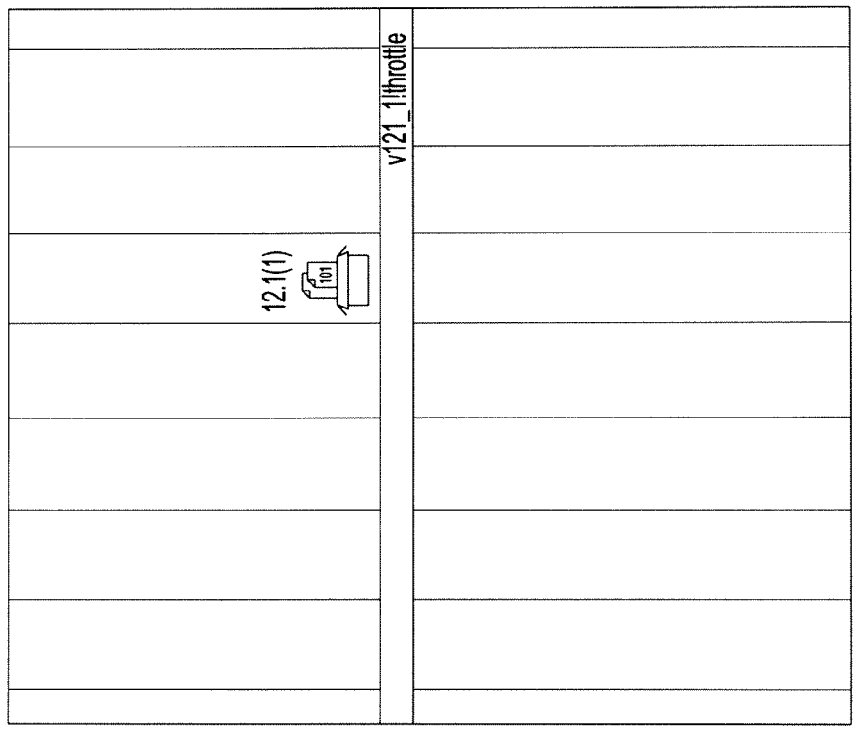

Release (FIG. 3C)

A release represents the fact that, at a given point in time, the software hosted by the given branch has been marked for release to fulfill a business purpose (e.g., release to a customer). Release data comprises the following:

| Data Item | Explanation |
| --- | --- |
| Release Number | Release Identifier |
| Branch | Branch on which the release was built |
| Release Date | date on which the release label was created |
| Release Type | Type of release maintenance, rebuild, interim or weekly |

Build (FIG. 3D)

A build is a process of compiling and packaging source file into a binary image. Build data comprises the following:

| Data Item | Explanation |
| --- | --- |
| Build Label | Label from which the source code is built |
| Branch | Branch on which the build process is executed |
| Build Start Time | Start time |
| Build Stop Time | End time |
| FC Number | No of times the build is processed from the same label |

Merge

Merge is the process of source code transfer (feature additions and fixes) between two branches. Merge data (which includes Sync, Collapse and Port elements, discussed below) comprises the following:

| Data Item | Explanation |
| --- | --- |
| Merge Name | Label name on the source branch from where the merge is started |
| Source Branch | Branch from where the source code is to be transferred |
| Target Branch | Branch to which the source code is transferred |
| Start Date | Start date on source branch when the merge started |
| End Date | End date on target branch when the merge finished |
| Merge Type | Indicates if it is a 'SYNC', 'COLLAPSE' or 'PORT' |

Figure 3F:
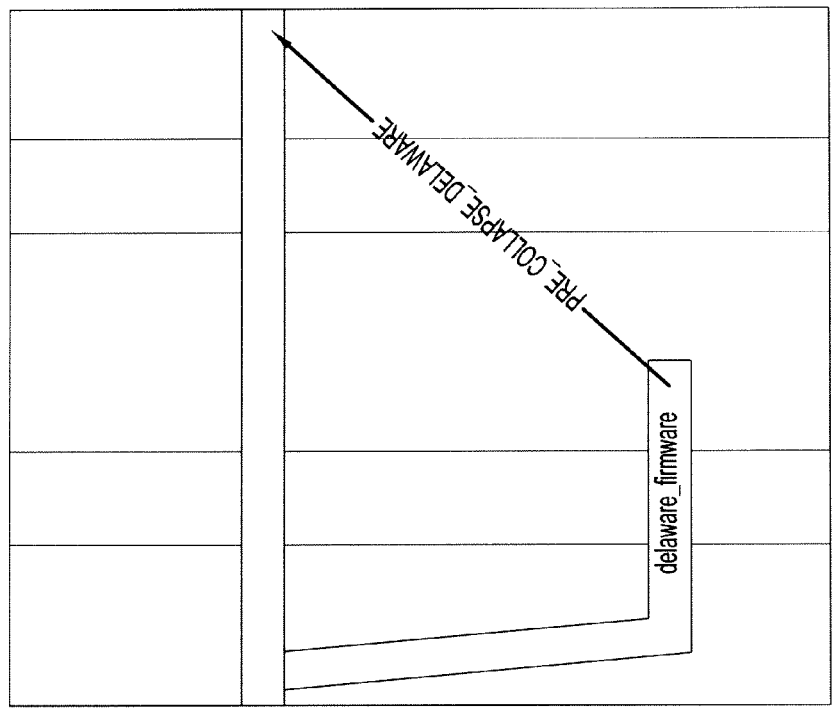
Figure 3E:
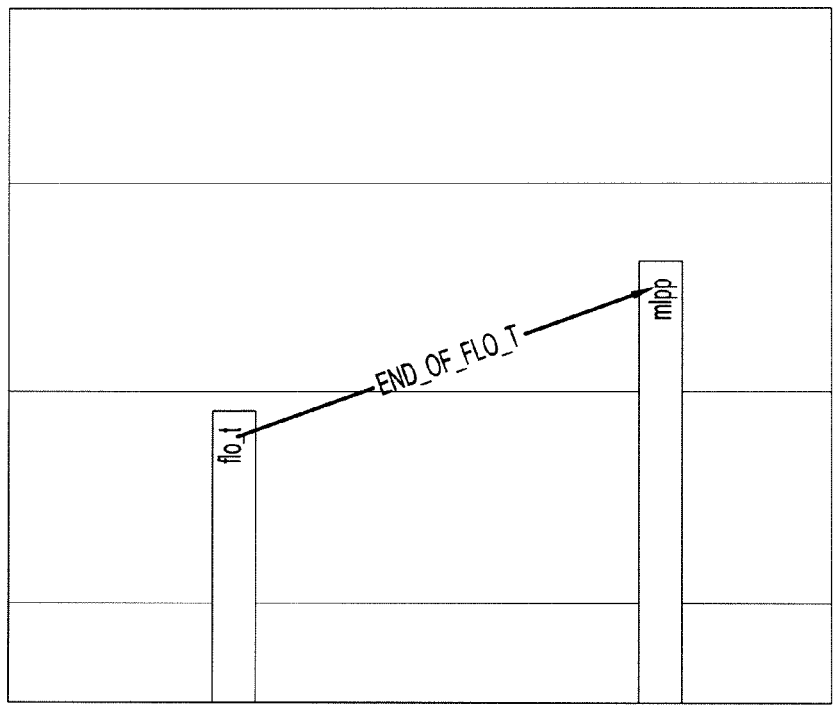

Sync (FIG. 3E)

A sync is the process of merging the changes made on a parent branch into a child branch.

Collapse (FIG. 3F)

A collapse is the process of delivering all the changes on a child branch back to its parent.

Figure 3H:
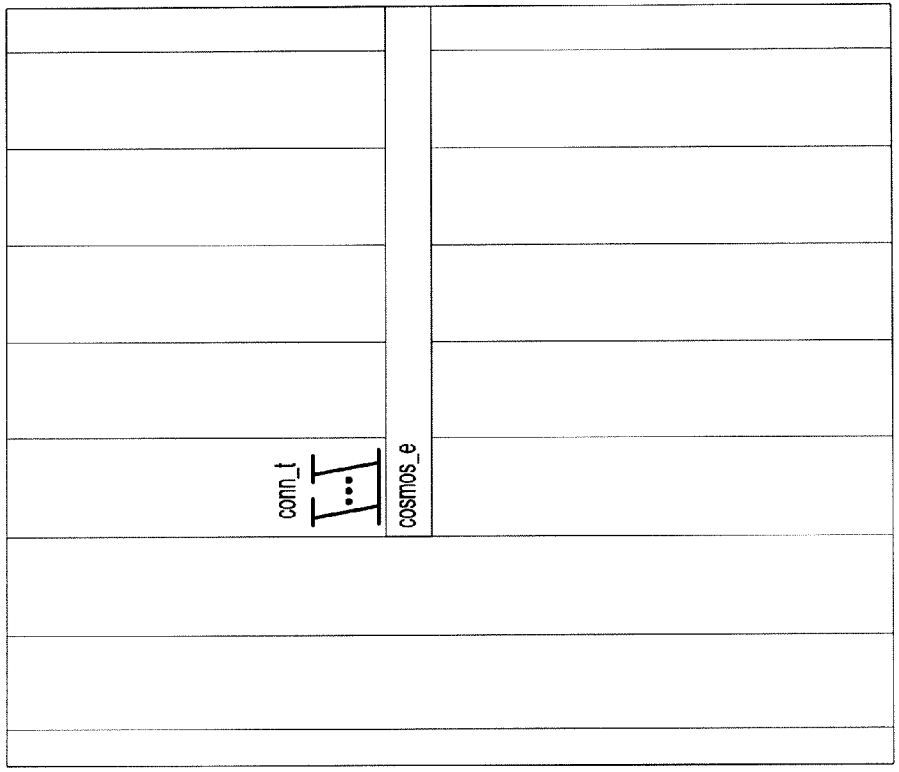
Figure 3G:
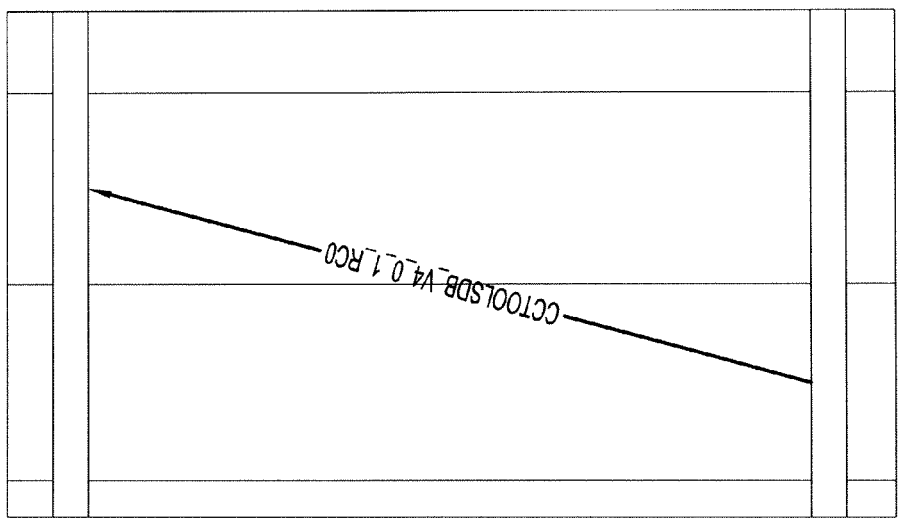

Port (FIG. 3G)

A port incorporates changes made in a source branch or a label into a target branch.

Reparent (FIG. 3H)

A reparent represents the fact that, at a given point in time, the given branch has had its parent branch changed. Reparent data comprises the following:

| Data Item | Explanation |
| --- | --- |
| Reparent Name | Label name on the source branch from where the merge is started |
| Branch Name | Name of the branch that has been reparented |
| Parent Branch Name | Name of the parent branch to which the branch has been reparented to |
| Reparent Date | Date on which the reparenting activity was performed |

Figure 3J:
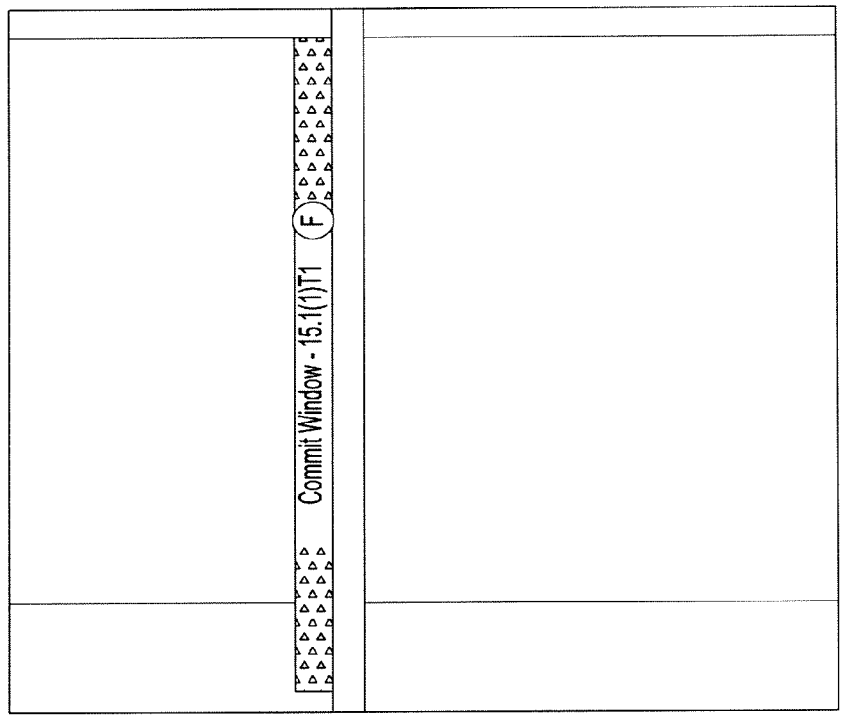
Figure 3I:
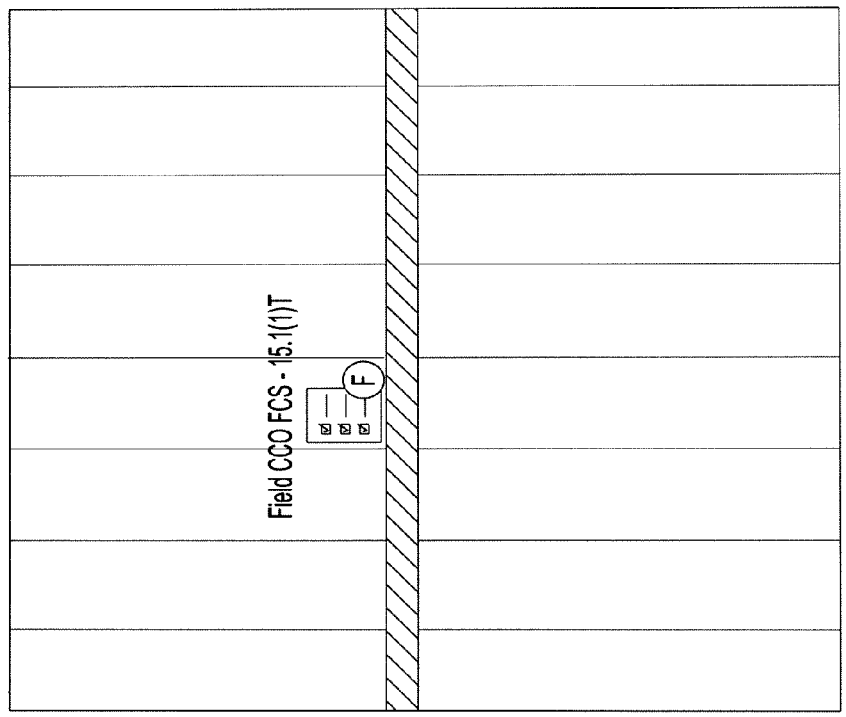

Milestone (FIG. 3I)

A milestone indicates a planning task that may be to be completed for delivering the end product. Milestone data comprises the following:

| Data Item | Explanation |
| --- | --- |
| Milestone Name | Milestone Identifier |
| Branch Name | Name of the branch |
| Release Number | Release for which the milestone needs to be completed |
| Milestone Type | Identifies the milestone |
| Milestone Date | Date by which the milestone needs to be completed |
| Milestone Date Type | Indicates whether the milestone is 'FORECAST', 'ACTUAL', 'TARGET' or 'COMMIT' |

Activity (FIG. 3J)

An activity represents any continuous time-spanning fact, action or event that applies to a branch that is related to the development or release of software hosted by it. Activity data comprises the following:

| Data Item | Explanation |
| --- | --- |
| Activity Name | Activity Identifier |
| Branch Name | Name of the branch |
| Release Number | Release for which the activity needs to be completed |
| Activity Type | Identifies the activity |
| Activity Start Date | Date by which to start the activity |
| Activity Stop Date | Date by which to end the activity |
| Activity Date Type | Indicates whether the activity is 'FORECAST', 'ACTUAL', 'TARGET' or 'COMMIT' |

Marker—A marker represents a note, a comment or the documentation of a given fact that is relevant to the given branch or release. Marker data comprises the following:

| Data Item | Explanation |
| --- | --- |
| Marker Name | Marker Identifier |
| Branch Name | Name of the branch |
| Release Number | Release for which the activity needs to be completed |
| Marker Type | Identifies the marker |
| Marker Date | Date by which the marker is to be completed |

Figure 3L:
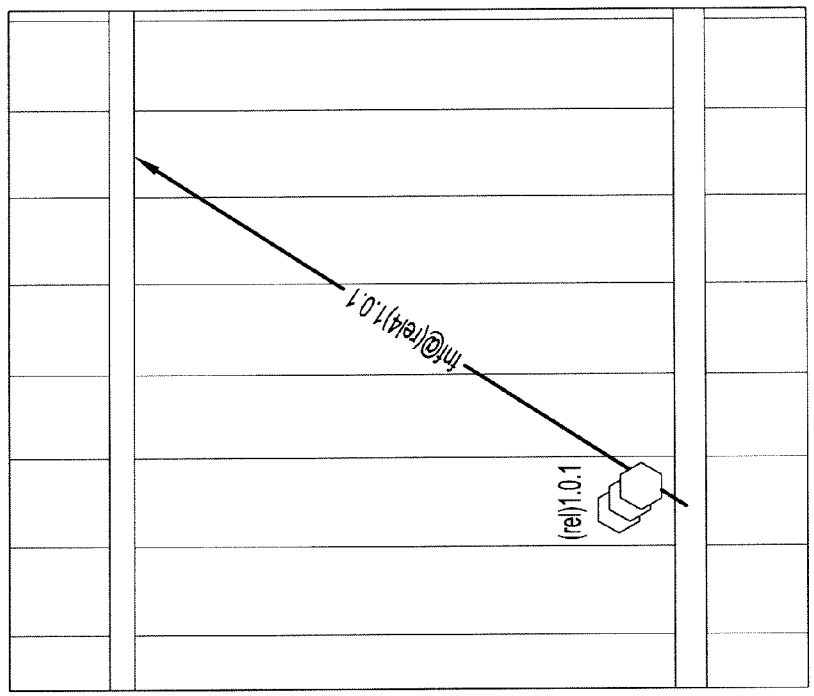
Figure 3K:
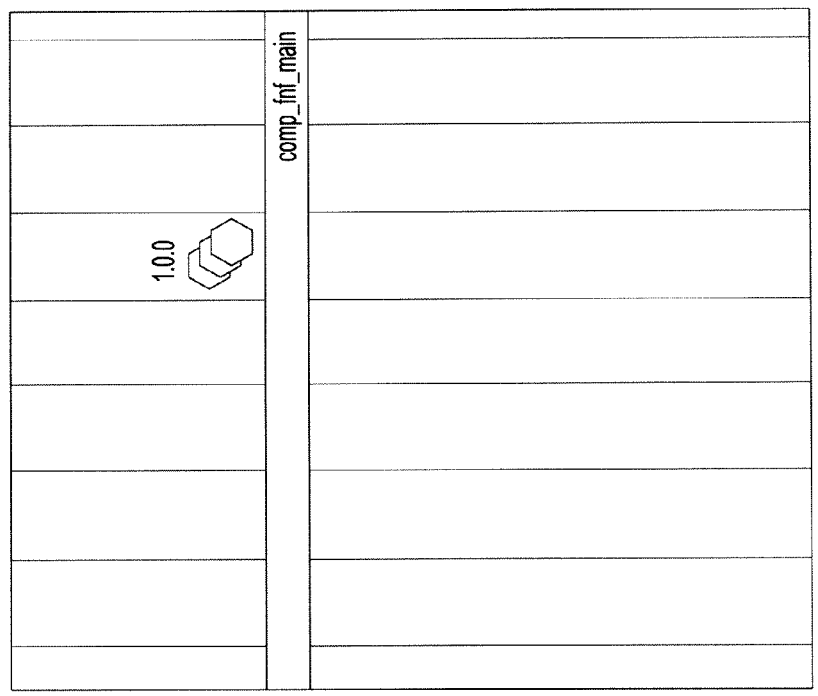

Component Version (FIG. 3K)

A version is a labeled snapshot on a branch that contains reusable software features. Component version data comprises the following:

| Data Item | Explanation |
| --- | --- |
| Component Version Name | Component version identifier |
| Branch Name | Name of the branch |
| Version Date | Date on which the label is created |
| Ref time | Last commit date before the label was created |

Component—A component is a set of source code files that are developed, versioned, tested, and released independently as a unit.

Repository—A repository is the database system that stores all of the committed versions of the various source code files versioned in the given source code base.

Export (FIG. 3L)

Export is the process of source code transfer (feature additions and fixes) between two branches in different repositories. Export data comprises the following:

| Data Item | Explanation |
| --- | --- |
| Export Name | Label name on the source branch from where the export is started |
| Source Branch | Branch from where the source code is to be transferred |
| Source Branch Repository | Repository of the source branch |
| Target Branch | Branch to which the source code is transferred |
| Target Branch Repository | Repository of the target branch |
| Start Date | Start date on source branch when the export started |
| End Date | End date on the target branch when the export finished |

Figure 4B:
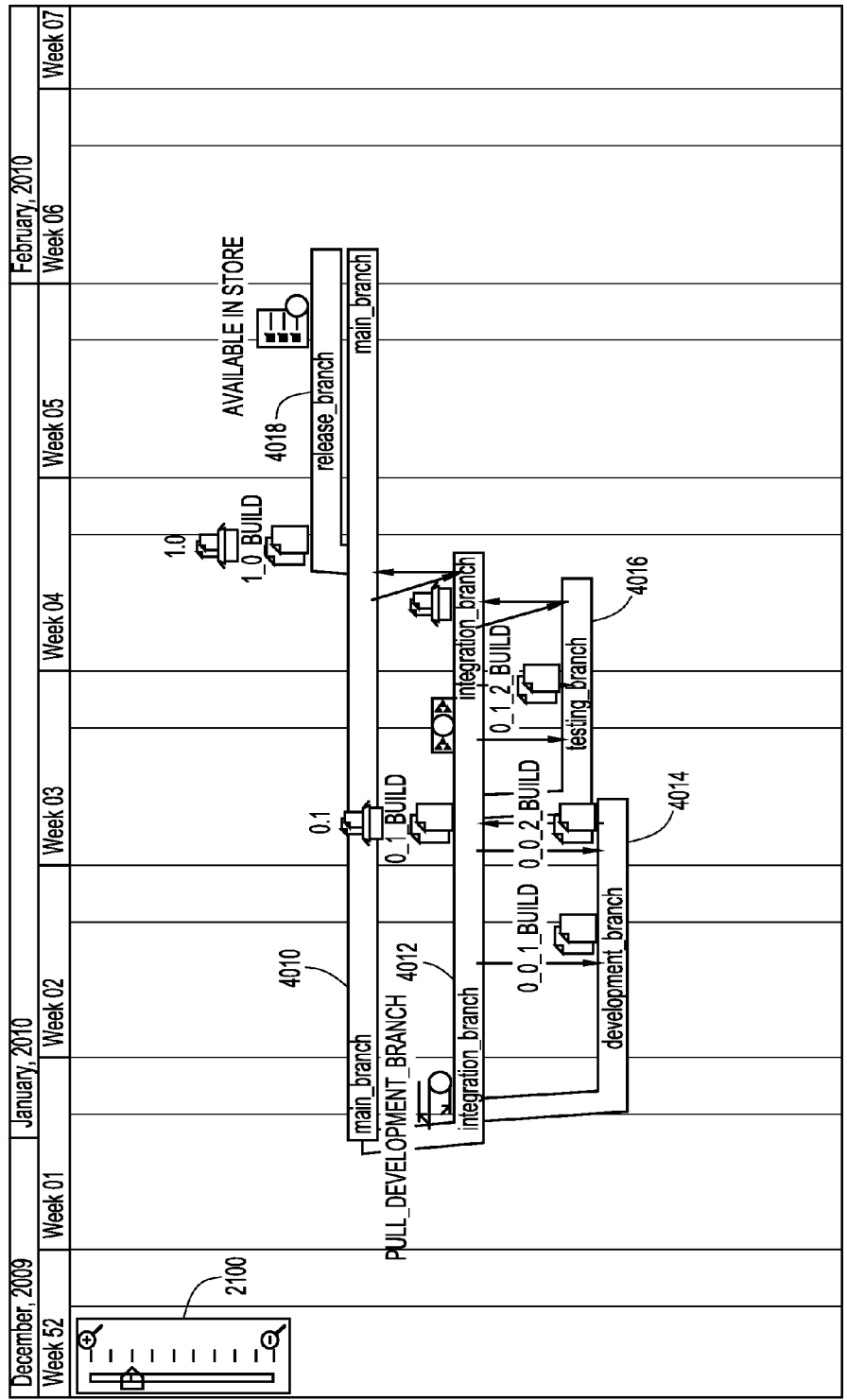

Reference is now made to FIGS. 4A and 4B. The main difference between the software map screen shots of FIGS. 4A and 4B (and of FIG. 2) is complexity and length of development time. Both depict a relatively centrally located "main branch" 4010 which can be considered a foundation code set for this particular software development project. From the main branch 4010 there extend multiple other branches. The vertically or substantially vertically extending lines provide a clearly seen indication of the timing of when a new aspect of development occurred, where the new aspect of development might be work on a portion of software that will be integrated into the main branch, i.e., an integration branch 4012, a separate development branch 4014, a testing branch 4016, and ultimately a release branch 4018.

In an embodiment, each branch has a length corresponding to a length of time needed to complete the work associated with the branch. Thus, for example, integration branch 4012 was completed (synchronized and collapsed) into main branch 4010 just prior to release.

As shown, the branches include indicia to provide their names. Of course, as shown in FIG. 2, additional information about a given branch can be obtained by selecting that branch with, e.g., a mouse or other pointing device.

Labels (FIG. 3B) can be seen throughout FIGS. 4A and 4B, as well as release events (FIG. 3C), build events (FIG. 3D), Sync events (FIG. 3E), and Collapse events (FIG. 3F). Milestones (FIG. 3I) and other activities (FIG. 3J) are also represented in FIGS. 4A and 4B. Although several specific events, including port events (FIG. 3G), reparent (FIG. 3H), compversion (FIG. 3K), and Export (FIG. 3L) (and their associated icons and other indicia) are not expressly shown in the software map rendering shown in FIGS. 4A and 4B, those skilled in the art will appreciate that a more complicated software development endeavor would likely include these additional events.

FIGS. 5A-D show still other features of the SM application. For example, the SM application may provide editing capabilities to manage and plan software information. This editing capability can, e.g., allow users to create events and branches by clicking on an event or a branch in a palette toolbar (FIG. 5A) and then dragging and dropping the selected event or branch on the software map. Other functionality also allows users to create planned branches and merges by extending their actual counterparts (see FIG. 5B in which the right hand portion of the branch is extended by the broken line rectangle).

Additionally, SM application functionality can allow users to select events and branches and move them to indicate a change in, e.g., their dates. In this regard, contextual menus (FIG. 5C) may be provided by, e.g., right clicking while hovering over a given event or branch, thus offering additional options to change the selected software element's data and persist it permanently.

Figure 5A:
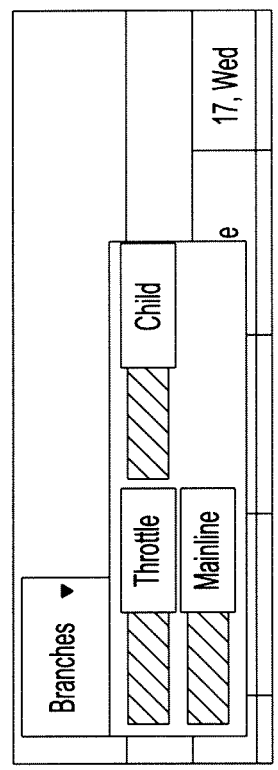
FIGS. 5A-D are screenshots of still additional features that can be employed to render a software map.
Figure 5B:
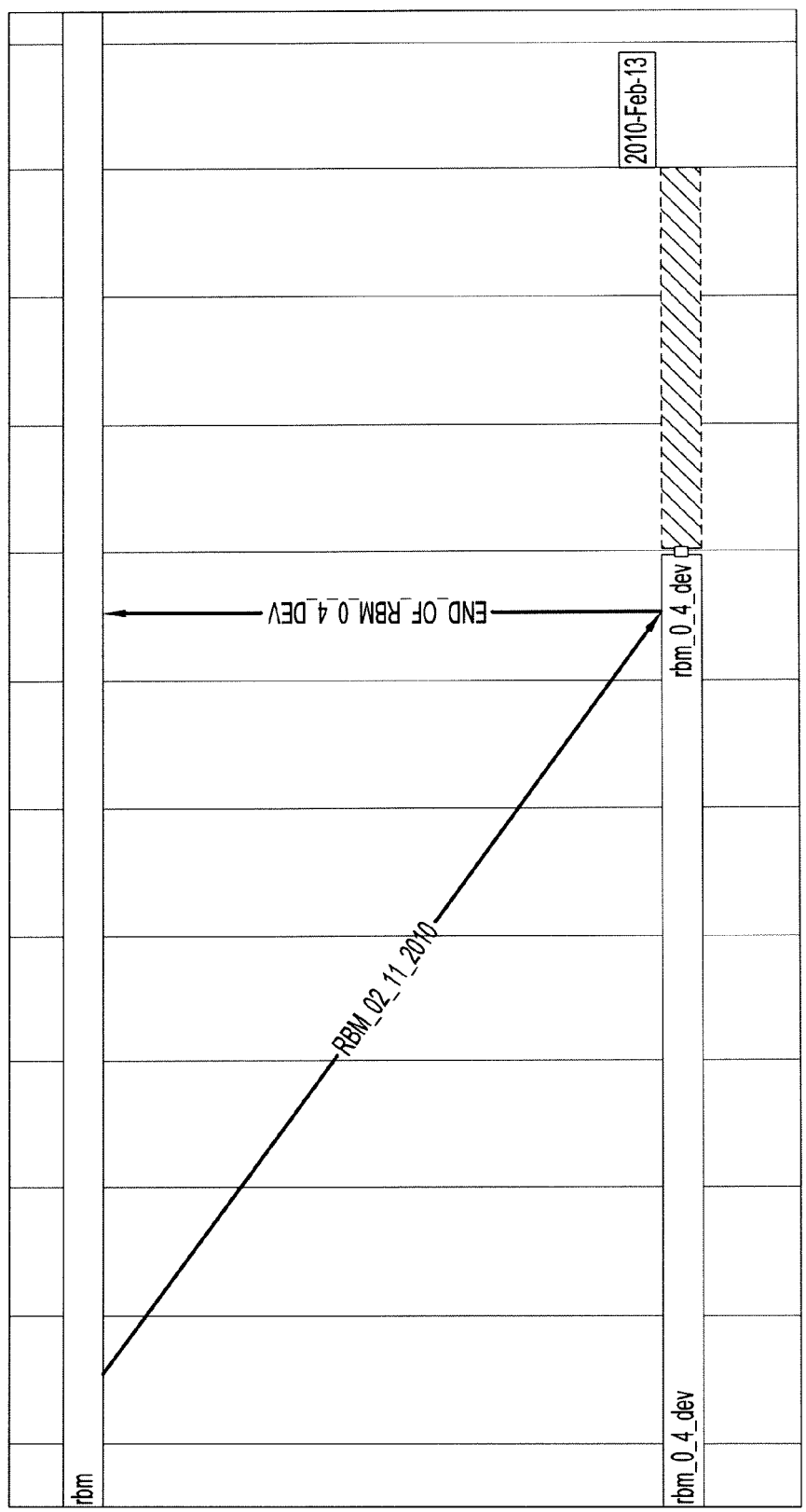
Figure 5C:
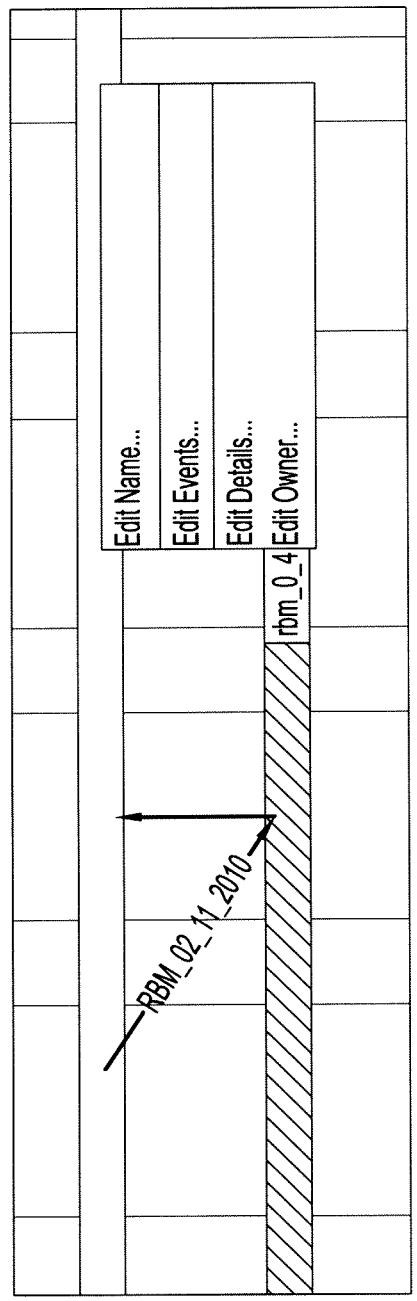
Figure 5D:
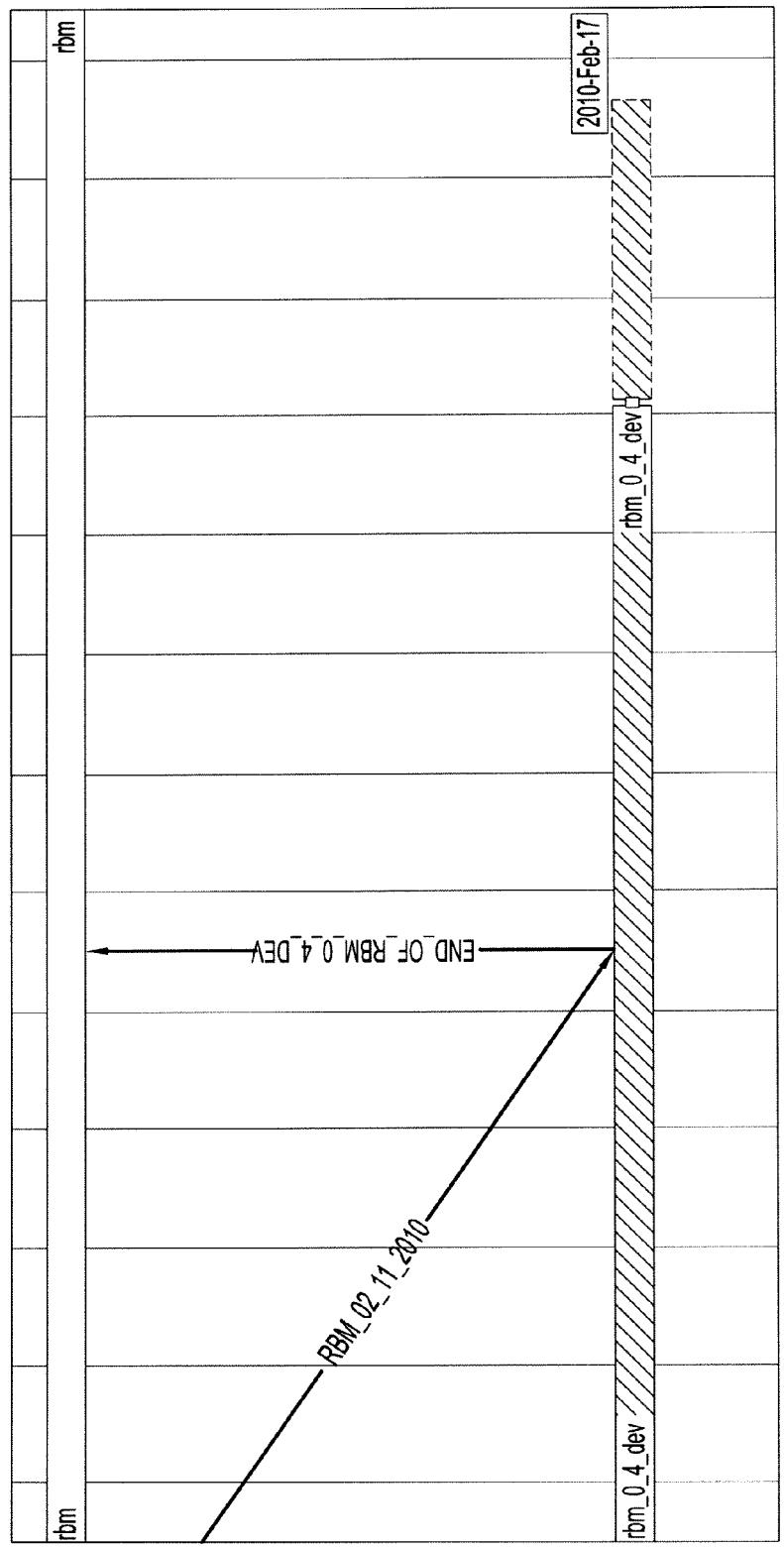

The SM application also may allow users to graphically extend planned branches and merges so that their start or end dates are changed with ease in an intuitive fashion (FIG. 5D, showing another extension of a branch using a broken line, where the length of the branch is filled with diagonal lines).

Lastly, in one implementation, the SM application allows users to remove software elements via the contextual menus and via keyboard shortcuts. During the removal operation software information relationships are updated and the information is permanently persisted.

Figure 6:
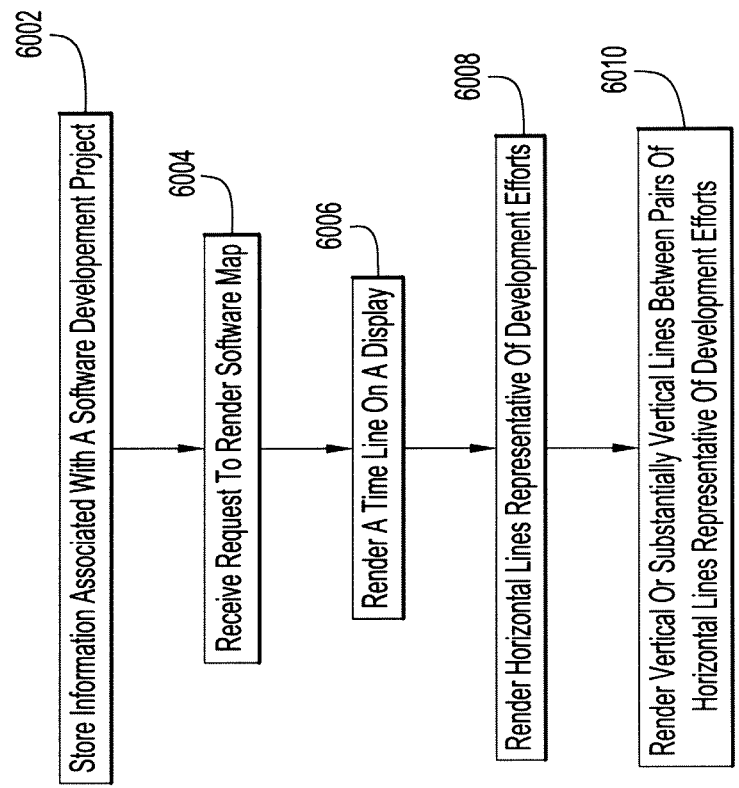
FIG. 6 depicts an example series of steps that may be performed to obtain data employed to generate a software map and render the software map for graphical display.

FIG. 6 shows an example series of steps for collecting data needed to generate a software map and for presenting the collected data in way that enables a user to visualize the events that surrounded a given software development effort.

At step 6002 information associated with a software development project is stored, such as in one or more of the databases shown in FIG. 1. Then, at 6004, a request is received to render a software map associated with a selected software development project. The request may be received via, e.g., the Internet. In response to the request, a software map is rendered on a display. At step 6006, a time line is rendered on the display to provide temporal context the software development project. Then, or simultaneous with step 6006, steps 6008 and 6010 are performed. These steps (1) render horizontal lines representing particular efforts related to the software development project (e.g., developing, testing, etc.) that extend between endpoints defined, substantially, by start and end dates stored in the one or more databases, and that are aligned with a time scale of the timeline, and (2) render vertically or substantially vertically extending lines between and connecting pairs of horizontal lines, wherein each vertically or substantially vertically extending line represents dates of the specific events (a merge, a sync, a collapse, a release, etc.) associated with the software development project.

Although the system and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following.

What is claimed is:

1. A method, comprising:
    storing, in an electronic database, information associated with a software development project, the information including start and end dates of particular efforts made in connection with the software development project and dates of specific events associated with the software development project;
    rendering on a display a timeline;
    rendering on the display a software map comprising:
        displaying a first branch and a second branch, each comprising a horizontal line representing the particular software development efforts that extend between endpoints defined, by the start and end dates, and that are aligned with a time scale of the timeline;
        extending a line between the first branch and the second branch, wherein the line represents a software code branch event comprising the start date of the development of software associated with the second branch, and wherein the first branch and the second branch persist on the timeline after the software code branch event; and
        in response to receiving, from an Application Programming Interface (API), a software code merge event merging software code associated with the second branch into a portion of software code associated with the first branch, automatically extending a second line between the second branch and the first branch, wherein the second branch terminates on the timeline after the software code merge event; and
    in response to receiving the software code merge event, automatically updating data associated with the second branch and the first branch; and
    in response to hovering over a selected branch, rendering a window in a foreground that provides text-based details about the selected branch and further rendering a line connecting the window to the selected branch, the text-based details at least including information regarding branch status of being active or inactive.

2. The method of claim 1, further comprising:
    receiving data rendering customizations, wherein the data rendering customizations comprise indicators of data type and data quantity for display; and
    storing data display customizations for future use.

3. The method of claim 1, wherein rendering on the display a software map further comprises: in response to receiving a software branch reparent event associated with the first branch indicating that a parent branch of the first branch has changed, automatically displaying a reparent event indicator on the first branch; and
    automatically updating reparent data associated with the first branch.

4. The method of claim 1, further comprising rendering on the display, in the foreground, a graphical representation of a full software map along with an indication of which portion of the full software map is being rendered in the background.

5. The method of claim 4, further comprising receiving an indication to zoom in to a portion of the software map, and in response to the indication, changing how much of the full software map is rendered in the background.

6. The method of claim 1, further comprising rendering icons along with one of more of the horizontal lines, wherein the icons represent the specific events associated with the software development project.

7. The method of claim 1, further comprising receiving, via the Internet, a request to render the software map.

8. The method of claim 1, further comprising receiving additional information, input via a dialogue box rendered on the display, to add to the software map.

9. The method of claim 8, wherein the information comprises a milestone or an activity associated with the software development project.

10. The method of claim 1, wherein the text-based information further comprises one or more of a name of the branch, a start and end date, a bug commit severity, a branch classification, a bug commit enclosure, a parent branch, a branch creation date, a task branch, a bug state, a branch state, a branch hierarchy, a notification list, and a base label creation date.

11. An apparatus, comprising:
    a server computer;
    at least one database in communication with the server, the database storing, information associated with a software development project, the information including start and end dates of particular efforts made in connection with the software development project and dates of specific events associated with the software development project;
    the server computer comprising a processor readable medium encoded with instructions that, when executed by a processor, cause the processor to:
    render on a display a timeline; and
    render on the display a software map comprising:
        a first branch and a second branch, each comprising a horizontal line representing the particular software development efforts that extend between endpoints defined, by the start and end dates, and that are aligned with a time scale of the timeline; and
        a line extended between the first branch and the second branch, wherein the line represents a software code branch event comprising the start date of the development of software associated with the second branch, and wherein the first branch and the second branch persist on the timeline after the software code branch event;
    receive, from an Application Programming Interface (API), a second specific event indicating a software code merge event merging software code associated with the second branch into a portion of software code associated with the first branch;
    automatically update data associated with the second branch and the first branch in response receiving the software code merge event; and
    automatically extend a line between the second branch and the first branch, in response to receiving the software code merge event, wherein the second branch terminates on the timeline after the software code merge event; and
    in response to hovering over a selected branch, rendering a window in a foreground that provides text-based details about the selected branch and further rendering a line connecting the window to the selected branch, the text-based details at least including information regarding branch status of being active or inactive.

12. The apparatus of claim 11,
wherein the processor readable medium further comprises instructions that, when executed by the processor, cause the processor to:
receive data rendering customizations, wherein the data rendering customizations comprise indicators of data type and data quantity for display; and
store data display customizations for future use.

13. The apparatus of claim 11, wherein the processor readable medium that renders on the display a software map further comprises instructions that, when executed by the processor, cause the processor to: in response to receiving a software branch reparent event associated with the first branch indicating that a parent branch of the first branch has changed, automatically display a reparent event indicator on the first branch; and
automatically update reparent data associated with the first branch.

14. The apparatus of claim 11, wherein the processor readable medium further comprises instructions that, when executed by the processor, cause the processor to:
render on the display, in the foreground, a graphical representation of a full software map along with an indication of which portion of the full software map is being rendered in the background.

15. The apparatus of claim 14, wherein the processor readable medium further comprises instructions that, when executed by the processor, cause the processor to:
receive an indication to zoom in to a portion of the software map, and in response to the indication, change how much of the full software map is rendered in the background.

16. The apparatus of claim 11, wherein the processor readable medium further comprises instructions that, when executed by the processor, cause the processor to:
render icons along with one of more of the horizontal lines, wherein the icons represent the specific events associated with the software development project.

17. The apparatus of claim 11, wherein the processor readable medium further comprises instructions that, when executed by the processor, cause the processor to:
receive, via the Internet, a request to render the software map.

18. The apparatus of claim 11, wherein the processor readable medium further comprises instructions that, when executed by the processor, cause the processor to:
receive additional information, input via a dialogue box rendered on the display, to add to the software map.

19. The apparatus of claim 18, wherein the information comprises a milestone or an activity associated with the software development project.

20. The apparatus of claim 11, wherein the text-based information further comprises one or more of a name of the branch, a start and end date, a bug commit severity, a branch classification, a bug commit enclosure, a parent branch, a branch creation date, a task branch, a bug state, a branch state, a branch hierarchy, a notification list, and a base label creation date.

* * * * *